Dec. 7, 1926.

E. G. DE LOE 1,609,866

VEHICLE REBOUND CHECK

Filed Sept. 24, 1924   2 Sheets-Sheet 1

E. G. De Loe, INVENTOR.

by *Attorney*

Dec. 7, 1926. 1,609,866
E. G. DE LOE
VEHICLE REBOUND CHECK
Filed Sept. 24, 1924  2 Sheets-Sheet 2

Inventor
E.G. DE LOE.

By *Burkent*

Attorney

Patented Dec. 7, 1926.

1,609,866

UNITED STATES PATENT OFFICE.

EDWARD G. DE LOE, OF CLEVELAND, OHIO, ASSIGNOR OF ONE-EIGHTH TO S. ERNEST DE LOE AND ONE-EIGHTH TO O. PAUL DE LOE, BOTH OF CLEVELAND, OHIO.

VEHICLE REBOUND CHECK.

Application filed September 24, 1924. Serial No. 739,503.

This invention relates to rebound checks for vehicles and has for one of its objects the provision of a rebound check of comparatively simple design that will be highly efficient in operation and capable of being produced on a commercial scale at a comparatively low cost.

A further object of the invention is to provide a rebound check that will have practically no effect on the normal movements of the body of the vehicle relative to the axles but will have a strong retarding effect on the rebound of the body from abnormal deflections of the springs.

A further object of the invention is to provide a rebound check that is so constructed that the frictional retarding or braking mechanism will not be subject to excessive wear and in which means are provided for varying the retarding action and for compensating for any wear that occurs. Another object of the invention is to provide a rebound check with simple means for securing it to the frame of a vehicle and in which such means is adapted for application to frames varying in size and permits angular adjustment of the rebound check to suit necessary variations in location incident to the application of the rebound check to different types of vehicles.

Other objects of the invention and the features of novelty will be apparent from the following description taken in connection with the accompanying drawings, of which:

Figure 1 is a fragmentary side elevation of a motor vehicle having my invention applied thereto, certain parts being shown in section;

Fig. 2 is a transverse section on the line 2—2 of Fig. 1;

Figure 4:
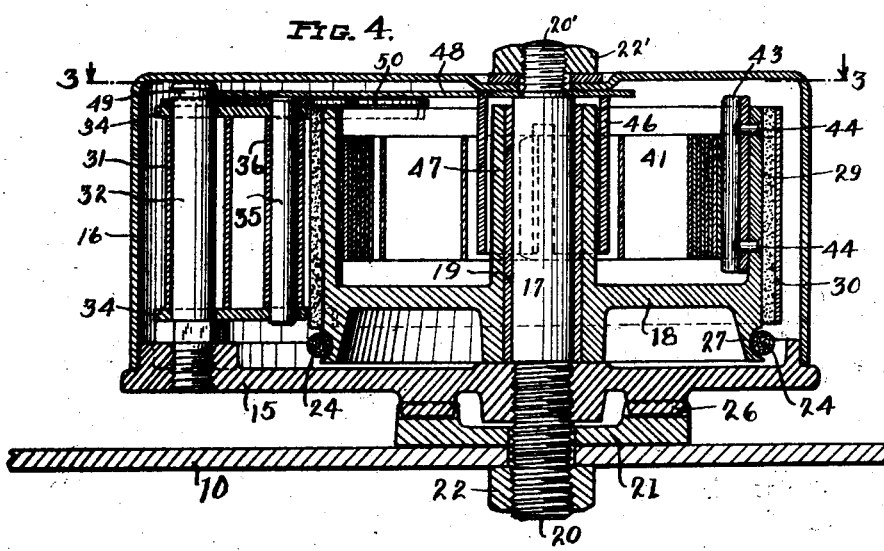
Fig. 4 is a section on the line 4—4 of Fig. 3.

Referring to the drawings, 10 indicates one of the side members of the frame of a motor vehicle, 11 one of the wheels and 12 one of the front springs. The front axle is indicated at 13 and at 14 I have indicated one of my improved rebound checks. The housing of the rebound check consists of a plate 15, which is preferably made of malleable iron, and a cover 16. A stud 17 is threaded into the plate 15, as best shown in Fig. 4 and this stud forms a journal for the rotatable brake drum 18, the hub of which is preferably provided with a bushing 19, of suitable bearing metal, which rotatably fits the stud 17. The threaded end 20 of the stud 17 projects exteriorly of the plate 15, through a bracket 21 and the frame member 10, and is provided with a nut 22 at its end by which the housing and the bracket 21 are securely clamped to the frame member. The other end of the stud 17 has a threaded extension 20' and a nut 22' thereon secures the cover 16 to the plate 15.

Figure 1:
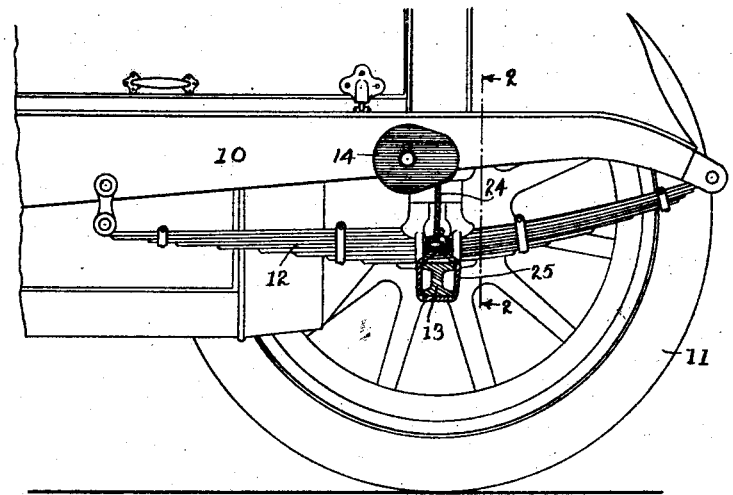
Figure 7:
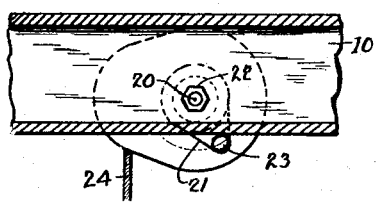
Fig. 7 is an enlarged section on the line 7—7 of Fig. 2.
Figure 2:
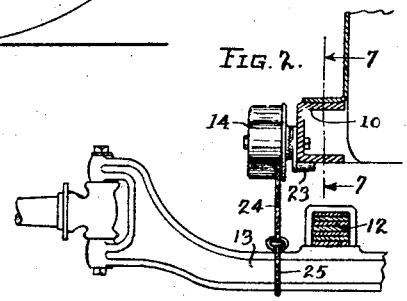

The bracket 21 consists of a plate having a lug or projection 23 that is adapted to engage with one of the flanges of the frame member 10 and thereby prevent rotation of the bracket by the turning action to which the housing is subjected by the cable 24 which is secured around the axle 13, as indicated at 25 in Fig. 1. The distance between the center of the bracket 21 and the lug 23 is preferably made sufficiently great to permit the bracket to be applied to the various sizes of vehicle frames that are met with in practice. This feature is illustrated in Fig. 7 from which it will be obvious that, if the lug 23 were positioned directly below the center of the bracket, it would be spaced some distance from the flange of the frame member, thus permitting the bracket to be applied to a frame member of greater depth than that illustrated. In applying the bracket 21 it is rotated to bring the lug 23 into engagement with the flange on the frame member and the parts are clamped in position.

The adjoining faces of the bracket 21 and the plate 15 are provided with circles of teeth or serrations, indicated at 26, which interengage and permit the housing to be adjusted to various angular positions on the bracket 21 and, at the same time, when the parts are clamped together, these teeth or serrations securely hold the housing against the rotation of the bracket.

Figure 5:
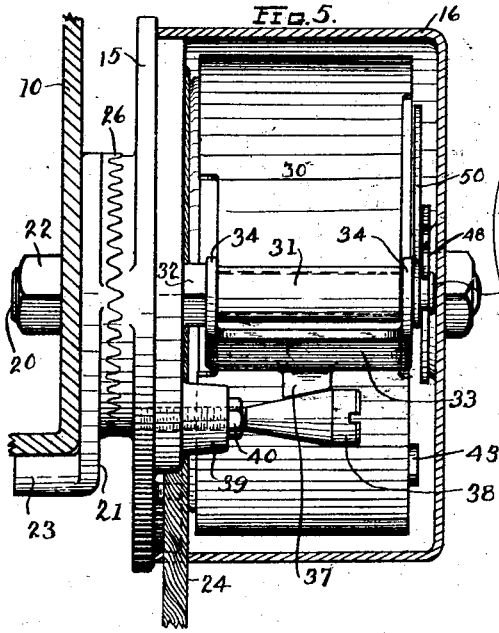
Fig. 5 is a composite view, the internal mechanism being shown in elevation, as seen from the left of Fig. 4, a part of the housing being shown in section.
Figure 3:
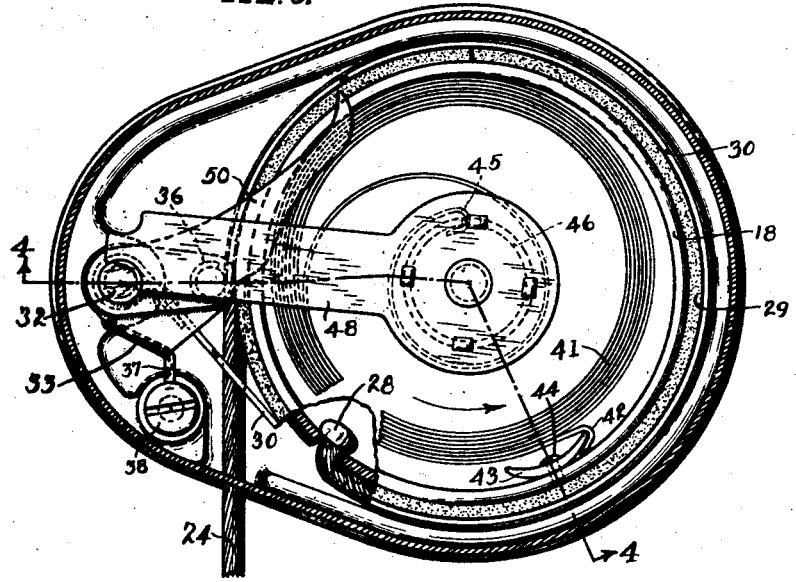
Fig. 3 is a sectional view of my improved rebound check, the section being taken on the line 3—3 of Fig. 4, certain parts being broken away to show other parts in section.

The brake drum 18 has a peripheral groove 27, adjacent one edge thereof to receive the cable 24 which is wrapped around the drum and has its end turned inwardly and secured, as indicated at 28 in Fig. 3, this end projecting through a suitable opening in the drum. The surface of the drum 18 has secured thereon a covering of friction material 29, such as the brake lining that is commonly employed on motor vehicle brakes. This friction material 29 may be secured to the drum 18 by being riveted thereto, or in any other suitable manner. A brake band 30 surrounds the drum 18 and has one end provided with an eye 31 which is attached to an anchoring stud 32, carried by the plate 15, and which serves to hold the brake band against rotation with the drum 18 when the latter is rotated in the direction of the arrow in Fig. 3. A member 33, having the parallel ears 34 pivotally mounted on the anchoring stud 32, carries a pin 35 which projects through the ears 34 and has attached thereto the eye 36, at the opposite end of the band 30. From Figs. 3 and 6 it will be evident that the brake band may be applied to the drum 18, or released therefrom, by swinging the member 33 on the stud 32. A lug 37 on the member 33 is adapted to engage with the tapered surface of the screw 38 which is adjustably secured in the plate 15 (see Fig. 5). The engagement of the lug 37 with the screw 38 limits the swinging movement of the member 33 in the direction which applies the brake band 30 to the drum 18 and thus limits the degree of application of the band to the drum and, what is the same thing, the retarding or braking effect of the band 30. From Fig. 5 it will be evident that by adjusting the screw 38, the extent of the swing of the member 33, toward the screw, may be varied to provide the desired braking effect of the band 30 on the drum 18 and to compensate for wear of the friction material or lining 29. The screw 38 has threaded engagement with the boss 39 and is locked in position by means of a nut 40.

A coil spring 41 is arranged within the brake drum 18 and has its outer end provided with a hook 42 to engage with the member 43 that is secured to the brake drum by rivets 44, or in any other suitable manner. The inner end of the spring 41 is also provided with a hook 45 which engages with a slot in the tube 46, surrounding the hub 47 of the drum 18. The tube 46 is riveted, or otherwise secured, to an arm 48 and the outer end of this arm engages a groove 49 in the end of the stud 32. The arm 48 is employed to wind up the spring 41 to give the desired tension thereto and the end of this arm is entered in the groove 49, the stud 32 then securely holding the arm 48 and thereby providing a substantial anchorage for the inner end of the spring 41.

A finger 50, having perforations to receive the stud 32 and the pin 35, so as to connect it with the member 33, projects into the path of the member 43. From Fig. 4 it will be noted that the member 43 projects above the upper edge of the drum 18 and this projection serves as a cam to engage with the finger 50 and thereby swing the latter outwardly, relative to the axis of the drum 18, the member 33, of course, being moved in the same manner.

Figure 6:
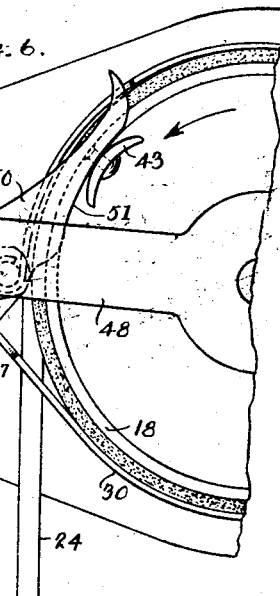
Fig. 6 is a diagrammatic view of a fragment of Fig. 3 with the parts shown in another relation.

In Fig. 6 I have illustrated the position of the parts when the member 43 is in engagement with the finger 50 and, in this position, the lug 37 stands away from the screw 38 and the pin 35 has been moved a sufficient distance, circumferentially of the drum, to substantially reduce the normal braking action of the band 30 on the drum 18, or to entirely release the band so as to permit the drum to rotate freely. It will be observed from Fig. 6 that the length of the edge 51, of the finger 50, which is engaged by the member 43, is sufficient to hold the parts in the relation shown in Fig. 6, throughout a substantial portion of the range of movement of the drum 18. In actual practice the extreme movement of the drum 18 may be as much as three-quarters of a revolution, more or less, which would carry the member 43 from the position shown in Fig. 3 considerably beyond the position shown in Fig. 6, in the direction of the arrow in the latter figure.

Assuming that the normal deflection of the vehicle spring 12 is illustrated in Fig. 1, then the rebound check should be applied and the cable 24 drawn out sufficiently to position the member 43 substantially as shown in Fig. 6, in which position the brake band 30 is released from the brake drum and produces little or no braking effect on the latter. With the parts thus arranged, the minor deflections of the spring 12, resulting from the movement of the vehicle over a comparatively smooth pavement would produce slight oscillations in the drum 18 without disengaging the member 43 from the finger 50, and thereby maintain the brake band 30 in the released position. The oscillations of the drum 18 are produced by the action of the cable 24 and the spring 41, the cable rotating the drum in one direction when the frame member 10 moves away from the axle 13 and the spring 41 moving the drum in the opposite direction when the frame member 10 moves toward the axle. An abnormal deflection of the spring 12, as when the wheel 11 passes over a bump in the road and forces the axle toward the frame member, causes the drum 18 to be rotated in the clockwise direction, as seen in Figs. 3 and 6, the member 43 passing beyond the end of the finger 50 so that upon the rebound of the frame member 10 away from the axle, the brake band 30 will engage the drum and frictionally retard the latter, which serves to materially reduce the velocity and acceleration of the rebound movement.

When the axle 13 moves away from the frame member 10, assuming the parts to be in the normal position shown in Fig. 1, and which movement may result from the wheel 11 dropping into a hole in the road, the cable 24 would rotate the drum 18 in the direction of the arrows in Figs. 3 and 6 and thus carry the member 43 beyond the finger 50, thereby releasing the latter and permitting the brake band to exert its normal braking effect on the drum 18 and this would check the movement.

While I have illustrated and described what I now consider to be the preferred embodiment of my invention, it will be apparent that changes may be made in the details of construction without departing from the spirit of my invention which is defined in the appended claims.

Having thus described my invention, what I claim is:

1. In a device of the class described, the combination of a housing, a rotatable brake drum therein, a brake band cooperating with said drum, a movable member to which one end of said brake band is attached, flexible means for rotating said drum in one direction, a spring for rotating said drum in the opposite direction, a cam on said drum, and means attached to said movable member and movable therewith and normally projecting into the path of said cam so as to be actuated thereby to reduce the braking action of said band on said drum throughout a portion of the range of movement of the drum.

2. In a device of the class described, the combination of a housing, a rotatable brake drum therein, a brake band cooperating with said drum, means for anchoring one end of said brake band in said housing, a movable member to which the other end of said brake band is attached, flexible means for rotating said drum in one direction, a spring for rotating said drum in the opposite direction, and cooperating cam means on said drum and said movable member for actuating the latter to reduce the braking action of said band on said drum throughout a portion of the range of movement of the drum.

3. In a device of the class described, the combination of a housing, a rotatable brake drum therein, a brake band cooperating with said drum, a fixed pivot in said housing to which one end of said brake band is attached, a movable member mounted on said pivot and having the opposite end of said brake band connected therewith, means whereby said drum is oscillated, and cooperating cam means on said drum and said movable member for actuating the latter to reduce the braking action of said band on said drum throughout a portion of the range of movement of the drum.

4. In a device of the class described, the combination of a housing, a rotatable brake drum therein, a brake band cooperating with said drum, a fixed pivot in said housing to which one end of said brake band is attached, a movable member mounted on said pivot and having the opposite end of said brake band connected therewith, means whereby said drum is oscillated, adjustable means cooperating with said movable member to limit the degree of the braking action of said band on said drum, and cooperating cam means for reducing the normal braking action of said band on said drum throughout a portion of the range of movement of the drum.

5. In a device of the class described, the combination of a housing, a rotatable brake drum therein, a brake band cooperating with said drum, a fixed pivot in said housing to which one end of said brake band is attached, a movable member mounted on said pivot and having the opposite end of said brake band connected therewith, means whereby said drum is oscillated, means for limiting the degree of the braking action of said band on said drum, and cooperating cam means for reducing the normal braking action of said band on said drum throughout a portion of the range of movement of the drum.

6. In a device of the class described, the combination of a housing, a rotatable member therein, a band brake surrounding said member, means for oscillating said member, a cam on said member, and means cooperating with said cam throughout a portion of the range of movement of said member and actuated thereby to reduce the normal braking action of said brake while said member is moving in said range.

7. In a device of the class described, the combination of a housing, a rotatable member therein, a brake cooperating with said member, means for oscillating said member, means for adjustably limiting the normal braking action of said brake on said member, and cooperating cam means for reducing the normal braking action of said brake throughout a portion of the range of movement of said member.

8. In a device of the class described, the combination of a housing, a rotatable member therein, a brake cooperating with said member, means for oscillating said member, means for adjustably limiting the normal braking action of said brake on said member, a cam on said member, and means cooperating with said cam throughout a portion of the range of movement of said member and actuated thereby to reduce the normal braking action of said brake while said member is moving in said range.

9. In a device of the class described, the combination of a housing, a rotatable brake drum therein, a flexible member attached to said drum and extending to the exterior of said housing for rotating the drum in one direction, a coil spring having one end attached to said drum and the other end fixed in said housing and whereby said drum is rotated in the opposite direction, a brake band cooperating with said drum and having one end thereof anchored in said housing, the other end of said brake band being movable to vary the braking action of said band on said drum, a movable member to which said other end of the brake band is attached, a cam on said drum, and means with which said cam cooperates throughout a portion of the range of movement of said drum and actuated by the cam to reduce the normal braking action of said band on said drum while said drum is moving in said range.

10. In a device of the class described, the combination of a housing, a rotatable brake drum therein, a flexible member attached to said drum and extending to the exterior of said housing for rotating the drum in one direction, a coil spring having one end attached to said drum and the other end fixed in said housing and whereby said drum is rotated in the opposite direction, a brake band cooperating with said drum and having one end thereof anchored in said housing, the other end of said brake band being movable to vary the braking action of said band on said drum, a movable member to which said other end of the brake band is attached, a cam on said drum, means with which said cam cooperates throughout a portion of the range of movement of said drum and actuated by the cam to reduce the normal braking action of said band on said drum while said drum is moving in said range, and adjustable means cooperating with said movable member to limit the degree of the normal braking action of said band on said drum.

11. In a device of the class described, the combination of a housing, a rotatable brake drum therein, a pivot carried by said housing, a brake band having one end thereof anchored on said pivot, a member arranged to swing on said pivot and to which the other end of said brake band is attached, a flexible member attached to said drum and extending to the exterior of the housing and whereby the drum is rotated in one direction, a coil spring for rotating said drum in the opposite direction and having one end attached to said drum, and anchoring means to which the other end of said coil spring is attached arranged coaxial with said drum and having an arm cooperating with said pivot to hold the anchoring means against rotation.

12. In a device of the class described, the combination of a housing, a rotatable brake drum therein, a pivot carried by said housing, a brake band having one end thereof anchored on said pivot, a member arranged to swing on said pivot and to which the other end of said brake band is attached, a flexible member attached to said drum and extending to the exterior of the housing and whereby the drum is rotated in one direction, a coil spring for rotating said drum in the opposite direction and having one end attached to said drum, anchoring means to which the other end of said coil spring is attached arranged coaxial with said drum and having an arm whereby said spring is wound, and means for normally holding said arm against rotation in said housing.

13. In a device of the class described, the combination of a housing, a rotatable member in said housing, a brake cooperating with said member, a spring for rotating said member in one direction, a flexible member attached to said rotatable member and adapted to be attached to a vehicle axle, a bracket adapted to be arranged against the side of a vehicle frame and having a laterally projecting lug for engagement with a flange of said frame and to prevent the bracket from turning, means for securing said housing and said bracket to said frame, and said housing and said bracket having interengaging means permitting angular adjustment of the housing on the bracket and whereby the housing is normally held against turning.

14. In a device of the class described, the combination of a housing, a rotatable member in said housing, a brake cooperating with said member, a spring for rotating said member in one direction, a flexible member attached to said rotatable member and adapted to be attached to a vehicle axle, a bracket adapted to be arranged against the side of a vehicle frame and having a laterally projecting lug for engagement with a flange of said frame and to prevent the bracket from turning, a threaded member carried by said housing and on which said rotatable member is mounted, said threaded member projecting exteriorly of said housing through said bracket and constituting means whereby the housing and bracket are clamped to said frame, and said housing and said bracket having interengaging means permitting angular adjustment of the housing on the bracket and whereby the housing is normally held against turning.

In testimony whereof I affix my signature.

EDWARD G. DE LOE.